June 2, 1953 J. W. CRYDER Re. 23,663

SMOKER'S PIPE

Original Filed May 9, 1947

INVENTOR.
JAMES W. CRYDER
BY
Lampkin & Van Valkenburgh
ATTORNEYS

Reissued June 2, 1953

Re. 23,663

UNITED STATES PATENT OFFICE 23,663

SMOKER'S PIPE

James W. Cryder, Denver, Colo., assignor of one-half to Pearl E. Cryder, Denver, Colo.

Original No. 2,593,731, dated April 22, 1952, Serial No. 746,984, May 9, 1947. Application for reissue July 10, 1952, Serial No. 298,218

4 Claims. (Cl. 131—219)

Matter enclosed in heavy brackets [ ] appears in the original patent but forms no part of this reissue specification; matter printed in italics indicates the additions made by reissue.

This invention relates to new and useful improvements in smokers' appliances and more particularly and specifically to a pipe attachment of which the following is a specification.

The primary object of this invention resides in the provision of a liner insert for a pipe which extends from the bowl bottom throughout the length of the stem, and which keeps the bowl [and stem] dry and clean at all times preventing the undesirable clogged and soggy formation which forms inherently in the smoking pipes now in use.

Another object of this invention lies in the provision of such a pipe liner which is quickly and easily removable from a pipe to allow the replacement thereof with a clean and new liner, thereby maintaining the bowl bottom and stem in a clean dry condition and eliminating the necessity of frequently cleaning the pipe and thus keeping the bowl wall formations in the pipe which are desirable but which are necessarily removed when a pipe is cleaned.

Still another object of this invention is the provision of such a pipe attachment or accessory as described which is of an extremely simple and inexpensive design and which is [cheap of] *inexpensive to* manufacture.

Still further improvements and advantages will readily appear to those skilled in the art when the following description is read in the light of the accompanying drawings in which.

Figure 1:
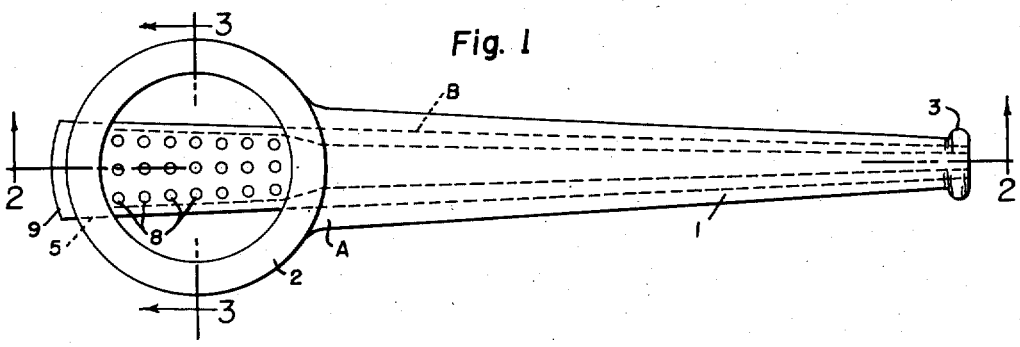
Fig. 1 is a top plan view of the improved pipe.
Figure 2:
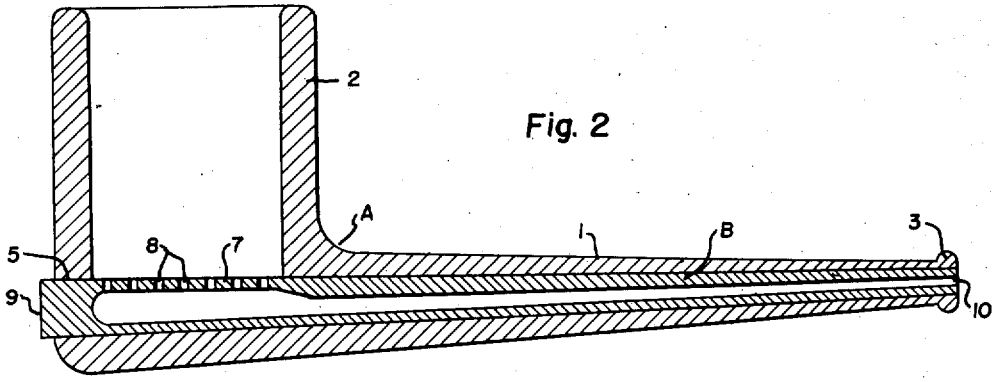
Fig. 2 is a vertical section taken on line 2—2 *of Fig. 1.*

Referring now to the accompanying drawings which illustrate the preferred embodiment of this invention A designates a smoker's pipe comprising the conventional elongated hollow stem 1 and an integrally formed bowl 2 opening into said stem from the bottom thereof. *The stem may extend to a mouthpiece 3, the stem 1 and mouthpiece 3 constituting an extension from the bowl 2.*

The bowl 2 is provided with a tobacco receiving chamber formed with a recess [3] *4* in the bottom thereof, *and formed as a continuation of the passageway of the stem 1,* the recess [3] *4* being *preferably* rectangular in transverse cross section below the chamber. [, said] *The* recess [extending] *also preferably extends as a slot 5* through the *front* wall of the bowl, *the upper surface of the wall of the opening or slot 5 being flat. The surfaces 6 at the bottom of the bowl at*

Figure 3:
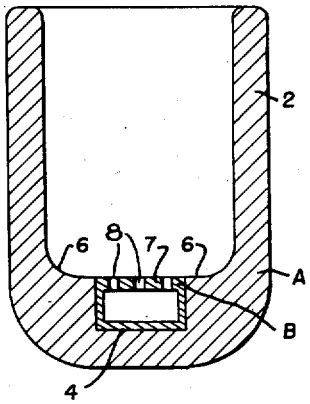
Fig. 3 is a vertical section taken on line 3—3 *of Fig. 1.*

*each side of the recess 4 are flat, as shown in Fig. 3.*

An elongated, *preferably* tapered, hollow tube *or liner* B of rectangular cross section *corresponding to that of the recess 4 for at least the length of the recess 4* through the [recess 3] *slot 5* and extends beneath the bowl bottom throughout the length of the recess, the portion of the hollow tube disposed in the recess [3] *4* having [its] *a wide, flat* upper surface 7 flush with the *flat surfaces 6 at the* bottom of the tobacco receiving chamber. [, where it is formed with a] *A* plurality of openings *or apertures 8* [6 which] *extend through the upper surface 7 to* establish communication between the tobacco receiving chamber and *the interior of* the tube, *and thereby permit smoke to be drawn through the stem from the tobacco chamber.* As shown, the *front and normally larger end 9 of the* tube *B is closed and also may extend* [extends] through the [recess] *slot 5* a substantial distance beyond the outer surface of the bowl 2. The *opposite and normally* small end *10* of the tube B is open [at 4] adjacent to the mouthpiece [C] of the stem so that smoke may be drawn therethrough. [, while the larger end 5 of the tube is closed.]

[Thus it may be seen that a complete liner has been provided for the pipe stem which separates the stem from the bowl thus preventing the formation of soggy accumulation in the stem, but will permit the passage of smoke thereinto through the restricted opening 6.]

When it is desirable to remove the liner tube B the extended end [5] *9* thereof is grasped and the liner pulled completely free of the remaining parts of the pipe, and a new liner may then be inserted thus maintaining a dry clean stem *and bowl bottom* without necessitating any cleaning of the pipe. *The liner B may be made of any suitable material, such as metal, plastic or the like, while the stem 1 and bowl 2 may be made of conventional materials for smokers' pipes. It has been found that the upper surface 7 of the liner remains clean and free of soggy tobacco accumulation, when the ashes and residue are knocked from the pipe, particularly when the liner is made of a metal such as aluminum. There may, however, be a liquid accumulation within the liner, which is discarded with the liner when the latter is replaced by a new liner.*

I wish it to be understood that I contemplate any modifications of the illustrated invention such as size, materials used, and general characteristics which fall within the scope of the appended [claim] *claims.*

Having thus described the construction and function of this invention what I desire to claim in Letters Patent is:

1. In a smoking pipe, a pipe bowl defining a bowl chamber, a pipe stem having a passageway formed longitudinally through the center thereof, formed integral with the bowl, said bowl having a recess rectangular in transverse cross section formed in the bottom of the bowl below the bottom of the bowl chamber, and providing a continuation of the passageway of the stem, a tubular member rectangular in transverse cross section providing a wide flat upper surface, fitted within the recess of the bowl and in the passageway of the pipe stem, the upper surface of said tubular member within the bowl being flush with the surface defining the bottom of the bowl chamber, the wide flat upper surface of the tubular member having rows of openings therein, through which smoke is drawn into the tubular member from the bowl chamber.

*2. In a smoking pipe, a bowl having walls and a bottom defining a chamber for receiving tobacco and the like; a stem extending rearwardly from the lower rear end of said bowl and having a longitudinally extending passage, said bowl having a recess in the bottom thereof below said chamber and formed as a continuation of said stem passage and the surface of the bottom of said bowl chamber being flat at each side of said recess, said bowl also having an outer wall thereof provided with an opening and the upper surface of the wall of said opening being flat, said opening forming a continuation of said recess; and a hollow liner fitting within the recess of said bowl and extending into said stem passage and into said opening, said liner having a flat upper surface flush with said flat surfaces in said chamber bottom and a plurality of apertures extending through said upper surface into the interior of said liner, and the front end of said liner being closed and said liner closing said opening with the upper surface of said liner at said opening being flat to correspond with the flat upper surface of said opening.*

*3. In a smoking pipe, a bowl having walls and a bottom defining a chamber for receiving tobacco and the like; a stem extending rearwardly from the lower rear end of said bowl and having a longitudinally extending passage, said bowl having a recess in the bottom thereof below said chamber and formed as a continuation of said step passage, said recess being rectangular in transverse section and the surface of the bottom of said bowl chamber being flat at each side of said recess; and a hollow liner fitting within the recess of said bowl and extending into said stem passage, said liner being rectangular in cross section at least within said recess and having a flat upper surface flush with said flat surfaces in said chamber bottom and a plurality of apertures extending through said upper surface into the interior of said liner.*

*4. In a smoking pipe, a bowl having walls and a bottom defining a chamber for receiving tobacco and the like; a stem extending rearwardly from the lower rear end of said bowl and having a longitudinally extending passage, said bowl having a recess in the bottom thereof below said chamber and formed as a continuation of said stem passage and the surface of the bottom of said bowl chamber being flat at each side of said recess, said bowl also having an outer wall thereof provided with an opening and the upper surface of the wall of said opening being flat, said opening forming a continuation of said recess; and a hollow liner fitting within the recess of said bowl and extending into said stem passage and through said opening to a point forwardly of said bowl, said liner having a flat upper surface flush with said flat surfaces in said chamber bottom and a plurality of apertures extending through said upper surface into the interior of said liner, the front end of said liner being closed and closing said opening with the upper surface of said liner at said opening being flat to correspond with the flat upper surface of said opening, said liner being tapered from front to rear and said opening, bowl recess and stem passage being shaped corresponding to said liner.*

JAMES W. CRYDER.

References Cited in the file of this patent

UNITED STATES PATENTS

| Number | Name | Date |
|---|---|---|
| 572,240 | Andersson | Dec. 1, 1896 |
| 765,394 | Morgan | July 19, 1904 |
| 1,202,944 | Willis | Oct. 31, 1916 |
| 1,433,228 | Rapp | Oct. 24, 1922 |
| 1,927,956 | Segal | Sept. 26, 1933 |

FOREIGN PATENTS

| Number | Country | Date |
|---|---|---|
| 643,529 | Germany | Apr. 10, 1937 |
| 673,704 | Germany | Mar. 27, 1939 |
| 701,825 | France | Jan. 13, 1931 |